United States Patent [19]

Ellison et al.

[11] 4,198,951

[45] Apr. 22, 1980

[54] OVEN WALL PANEL CONSTRUCTION

[76] Inventors: Kenneth Ellison, 20 Avondale Cres., Markham; Alan S. Whike, R.R. #1, Caledon East, both of Ontario, Canada

[21] Appl. No.: 853,391

[22] Filed: Nov. 21, 1977

[51] Int. Cl.[2] .......................... A21B 1/00; E04C 1/10

[52] U.S. Cl. .................................. 126/19 R; 52/580; 126/273 R

[58] Field of Search ................ 126/19 R, 273, 273 R; 52/404, 588, 595, 580; 110/336

[56] References Cited

U.S. PATENT DOCUMENTS

| | | | |
|---|---|---|---|
| 947,779 | 2/1910 | Adams | 126/273 R |
| 948,450 | 2/1910 | Hussey | 52/404 |
| 1,236,718 | 8/1917 | Keep | 126/19 R |
| 1,425,620 | 8/1922 | Woodson | 126/19 R |
| 1,593,718 | 7/1926 | Gehnrich | 126/19 R |
| 1,614,411 | 1/1927 | Thomson | 52/404 X |
| 1,706,769 | 3/1929 | Buck | 126/19 R |
| 1,771,145 | 7/1930 | Sadwith | 126/19 R |
| 1,993,500 | 3/1935 | Benner | 52/404 X |
| 2,181,074 | 11/1939 | Scott | 52/404 |
| 2,209,816 | 7/1940 | Grapp | 52/404 |
| 2,683,795 | 7/1954 | Scheidler | 126/19 R |
| 2,856,039 | 10/1958 | Hawkinson | 52/580 X |
| 3,386,218 | 6/1968 | Scott | 52/595 X |
| 3,627,560 | 12/1971 | Morgan | 126/19 R X |
| 3,742,672 | 7/1973 | Schaeufele | 52/588 X |
| 3,815,311 | 6/1974 | Nisula et al. | 52/588 X |
| 4,037,379 | 7/1977 | Ozanne | 52/580 X |
| 4,103,467 | 8/1978 | Lindal | 52/580 X |
| 4,125,354 | 11/1978 | Andrews | 126/19 R |

*Primary Examiner*—Carroll B. Dority, Jr.

*Assistant Examiner*—Randall L. Green

[57] ABSTRACT

An oven roof or wall is formed from modular panels, each of which comprises an inner fabric and an outer fabric. Each such fabric is formed with an angle iron framework and somewhat resilient tie-bars or welded at their ends to flanges of the angle irons to maintain the inner and outer frameworks in spaced disposition while minimizing heat transfer by conduction and permitting some degree of relative movement on expansion and contraction of the module components. Suitable thermal insulation is provided within the module. Panels or skins are secured to the fabric frameworks and each such skin is secured to a framework and projects laterally so as slidingly to overlie the adjacent frame member of an adjacent panel in turn to permit relative movement during expansion and contraction.

10 Claims, 4 Drawing Figures

OVEN WALL PANEL CONSTRUCTION

FIELD OF THE INVENTION

This invention relates generally to oven structures and more particularly to modular oven panels for use in the construction of novel walls and roofs for ovens as well as to certain novel oven structures so obtained.

BACKGROUND OF THE INVENTION

In many industrial operations, use is made of high temperature ovens for the heat treatment of various products. Merely by way of example, there may be mentioned the use of ovens for removing solvents and drying coatings as applied to continuous metal strip.

Such ovens are very expensive to construct and maintain, particularly when it is necessary to ensure that mandatory operating requirements are always met. It is, for example to be noted that such ovens must sometimes be operated at temperatures as high as 300° to 400° C. while some factory codes require that the outside oven wall temperature shall not exceed about 35° C.

In addition to the high costs conventionally encountered in manufacturing, installing and maintaining such industrial ovens, further difficulties arise as a result of the temperature difference between the oven interior and the outside oven wall. Such temperature gradients through an oven wall lead to different degrees of expansion and contraction, particularly during oven start-up and shut-down and consequently the oven structure must be designed so as to be able to handle such expansion and contraction.

It is a principal object of this invention to provide a novel modular oven panel which can be used in oven wall and roof structures.

It is a further object of this invention to provide a modular oven panel intended for the aforesaid purpose and which panel, while having a relatively simple construction and being of compartively low cost, can be constructed to provide the degree of thermal insulation which is actually required in practice.

Yet another object of this invention is to provide a modular oven panel which can be utilized in the construction of an oven structure which in turn will be capable of properly handling the stresses caused by differential expansion and contraction during oven start-up and oven shut-down.

A further object of this invention is to provide a modular oven panel which can readily be used in the modification and/or repair of existing ovens.

Another object of this invention is to provide certain novel oven structures incorporating the modular oven panels provided by this invention.

Other objects of this invention will become apparent as the description herein proceeds.

SUMMARY OF THE INVENTION

Broadly, a modular oven panel in accordance with this invention can be defined as comprising: an inner fabric which in turn comprises: mutually spaced apart and mutually parallel first and second side frame members having lateral outer edges; mutually spaced apart and mutually parallel end frame members secured to said side frame members and extending perpendicularly therebetween to provide a relatively rigid rectangular frame structure; and an essentially continuous inner fabric skin secured to said frame structure and projecting laterally beyond said lateral outer edge of one of said side frame members and terminating laterally inwardly of said lateral outer edge of the other of said frame members so as to provide a transversely inwardly directed exposed face thereof; an outer fabric transversely outwardly spaced from said inner fabric and which in turn comprises: mutually spaced apart and mutually parallel first and second side frame members having lateral outer edges; mutually spaced apart and mutually parallel end frame members secured to said side frame members of said outer fabric and extending perpendicularly therebetween to provide a relatively rigid rectangular frame structure; and an essentially continuous outer fabric skin secured to said frame structure of said outer fabric and projecting laterally beyond said lateral outer edge of one of said frame members of said outer fabric and terminating laterally inwardly of said lateral outer edge of the other of said side frame members of said outer fabric so as to provide a transversely outwardly directed exposed face thereof; and tie members of limited resiliency secured to said frame members of said inner fabric and said outer fabric and extending therebetween to maintain said fabrics in mutually spaced apart disposition, whereby two said modular oven panels can be placed in side-by-side disposition with said inner fabric skin of one such panel overlying a said exposed face of a said side frame member of the inner fabric of the other such panel and with said outer fabric skin of one such panel overlying a said exposed face of said side frame member of the outer fabric of the other such panel for relative telescopic movement of such fabric skins across said exposed faces on expansion and contraction of said fabrics.

A modular oven panel in accordance with this invention will normally be provided with a thermal insulating material disposed between the inner and outer fabrics of the panel.

It is also preferred for the first and second side frame members of the inner fabric of such an oven to be disposed transversely opposite the first and second side frame members respectively of its outer fabric and for the inner and outer fabric skins to project laterally beyond the lateral outer edges of the first side frame members of the inner and outer fabrics respectively.

The side frame members and end frame members of the inner and outer fabrics of a modular oven panel in accordance with this invention are usefully in the form of angle members to which the fabric skins are secured and which have flanges projecting transversely towards each other with the tie members secured to such flanges.

When a modular oven panel in accordance with this invention is intended to be used as an oven wall panel, such panel is usefully formed with an end frame supporting member for supporting an oven roof panel and with the lower edge of its inner fabric disposed upwardly of the lower edge of its outer fabric so that, when erected in a vertical plane, such inner fabric is supported in a cantilevered manner from the outer fabric.

When a modular oven panel as provided by this invention is intended to be used as an oven roof panel, it is usefully provided with side frame members extensions by means of which it may be supported on an oven wall panel.

As already indicated herein, the present invention not only provides certain novel and useful modular oven panels, but also embraces certain oven panel structures comprising at least two such panels as hereinbefore defined when assembled together in the novel manner already indicated.

The various features of novelty which characterize the invention are pointed out with particularity in the claims annexed to and forming part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will now be described merely by way of illustration with reference to the accompanying drawings, in which.

DESCRIPTION OF THE PREFERRED EMBODIMENTS

Figure 1:
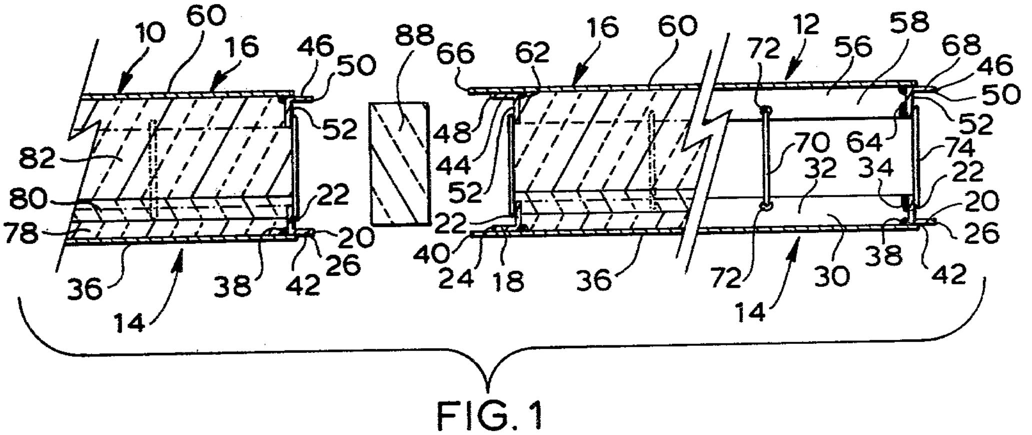
FIG. 1 is an exploded fragmentary horizontal sectional view taken downwardly through two modular oven wall panels in accordance with this invention and shown somewhat simplified to facilitate understanding of their construction.

Referring first to FIG. 1 of the accompanying drawings, it will be noted that there are shown fragmentarily therein two modular oven panels, generally indicated at 10 and 12, in accordance with this invention. Since the two panels are identical to each other and in their constructions, the same legends will be used herein to identify the same component parts of the two panels, as well as to identify the same component parts of other identical panels shown in the other figures of the drawings.

Each of the panels 10 and 12 comprises an inner fabric generally indicated at 14 and an outer fabric generally indicated at 16. The inner fabric 14 in turn comprises mutually spaced apart first and second side frame members which, in the embodiment illustrated, are in the form of elongated angle members 18 and 20 which have outwardly directed transverse flanges 22 and lateral outer edges 24 and 26 respectively. The inner fabric 14 of each of the panels 10 and 12 also comprises upper and lower end frame members (see FIG. 4) which are also usefully in the form of elongated angle members 28 and 30 respectively and each of which comprises an outwardly directed transverse flange 32.

The frame members 18, 20,28 and 30 of the inner fabric 14 are secured together, for example, by welding as indicated at 34 to provide a relatively rigid frame structure.

The inner fabric 14 of each of the panels 10 and 12 comprises an essentially continuous inner fabric skin 36 suitably formed of stainless steel sheet and which is secured to the frame members 18, 20, 28 and 30, for example, by welding as indicated at 38.

To simplify the drawings, not all of the welds are shown.

It is usefully to be noted at this juncture that the inner fabric skin 36 has a bottom edge 37 which is disposed generally at the lower end edges of the elongated side members 18 and 20.

It is also important to note that, for a reason yet to be explained, the inner fabric skin 36 projects laterally beyond the lateral outer edge 24 of the first side frame member 18 as indicated at 40 and terminates laterally inwardly of the lateral outer edge 26 of the second side frame member 20 to provide an inwardly facing exposed face portion 42 of that frame member 20.

The outer fabrics 16 of the panels 10 and 12 have similar structures to the inner fabrics 14 and comprise first and second vertical side frame members 44 and 46 having lateral outer edges 48 and 50 respectively, inwardly directed transverse flanges 52 and upper and lower horizontal angle end frame members 54 and 56 (FIG. 4) respectively with inwardly directed transverse flanges 58.

The outer fabric 16 of each of the panels 10 and 12 also comprises an outer fabric skin 60 which is secured, for example, by welding as indicated at 62, to the outer fabric frame members 44, 46, 54 and 56 which are, in turn, interconnected, for example, by welding as indicated at 64 to form a relatively rigid frame structure carrying the outer fabric skin 60.

The outer fabric skin 60 which may, for example, be of galvanized steel, of each of the panels 10 and 12, is secured to the outer fabric frame members 44, 46, 54 and 56 so as to project laterally beyond the lateral outer edge 48 of the first side frame member 44 as indicated at 66 and to terminate laterally inwardly of the lateral outer edge 50 of the second side frame member 46 to provide an outwardly facing exposed face portion 68.

It is also to be noted that the outer fabric skin 60 has a bottom edge 61 which is disposed upwardly of the lower end edges of the side frame members 44 and 46 which are slightly longer than the corresponding side frame members 18 and 20 of the inner fabric 14.

The inner and outer fabrics 14 and 16 respectively of each of the panels 10 and 12 are secured together and maintained in their mutually spaced apart positions by relatively thin and consequently somewhat resiliently flexible steel bars or tie members 70 terminally welded as indicated at 72 to the transverse flanges 32 and 58 of the opposed horizontal frame members 28, 30 and 54, 56 as well as by identical members 74 welded as indicated at 76 to the transverse flanges 22 and 52 of the side frame members 18, 20 and 44, 46 respectively.

The panels 10 and 12 also comprise thermal insulating material disposed between their inner fabrics 14 and their outer fabrics 16. In the panels 10 and 12 actually shown in the accompanying drawings, such insulation comprises two inner sheets 78 and 80 of an insulating material such as asbestos cloth which is capable of withstanding relatively high operating temperatures as well as an outer mass 82 of a less expensive insulating material such as mineral wool which has a somewhat lower temperature rating. It is to be noted that the insulation is partly omitted from the panel 12 in FIGS. 1 and 2 so as to reveal the internal structure and is omitted from all the panels shown in FIG. 4.

Figure 2:
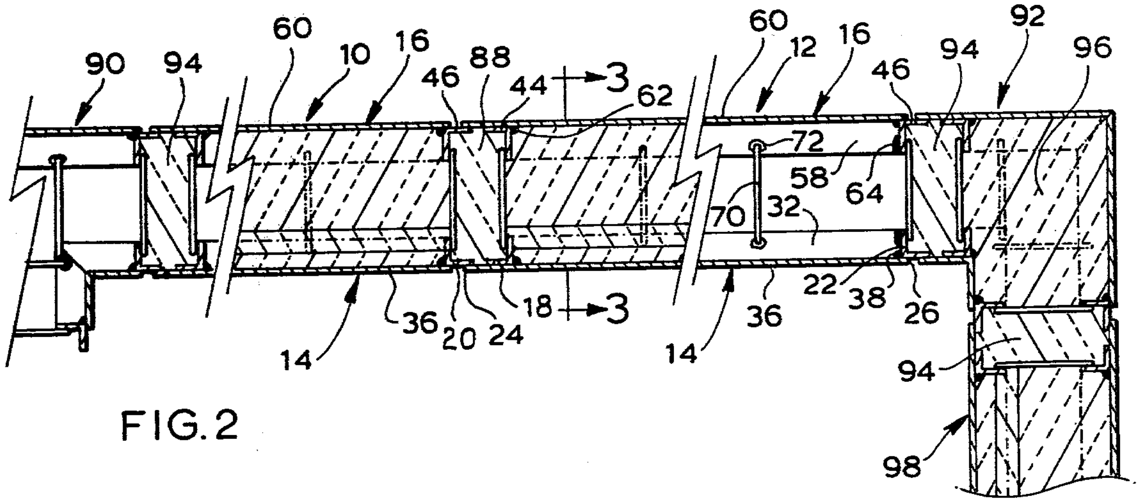
FIG. 2 is a norizontal sectional view similar to that of FIG. 1 but showing the two wall panels in their assembled side-by-side configuration and also illustrating two oven wall corner supports.
Figure 3:
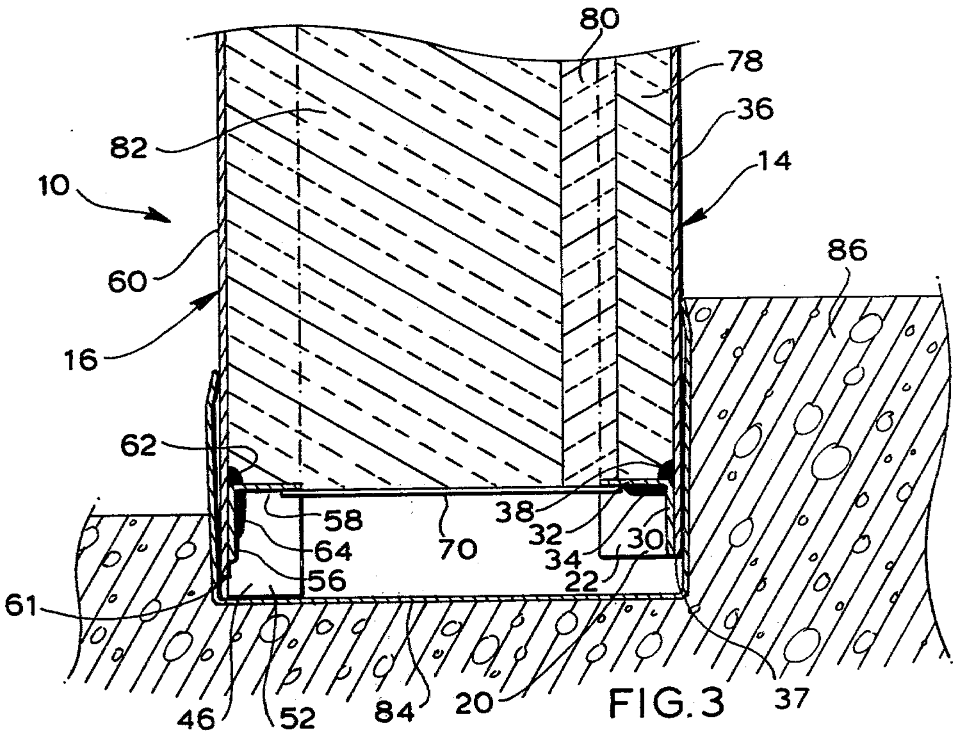
FIG. 3 is a fragmentary vertical sectional view of the lower portion of one of the wall panels shown in FIGS. 1 and 2 when taken as indicated by the arrows 3—3 of FIG. 2, and, FIG. 4 is a fragmentary vertical sectional view through one embodiment of an oven structure in accordance with this invention and showing the application of the invention to the construction of both an oven roof structure and an oven wall.

Having described the construction of the modular oven panels 10 and 12, the manner in which those panels are assembled to provide an oven wall structure will now be considered with particular reference to FIGS. 2 and 3 of the accompanying drawings.

For such assembly, the panels 10 and 12 are placed vertically in side-by-side disposition, the lower ends of those panels being suitably positioned in a base channel as shown in FIG. 3 in which the legend 84 represents a metal channel set in a concrete base 86. It will be understood that the panels 10 and 12 are supported by their outer fabrics 16, their inner fabrics 14 being disposed upwardly in a cantilevered manner with respect to the bottom of the channel 84 as will best be understood by reference to FIG. 3. During the erection of the panels 10 and 12, insulating material 88 is placed between the adjacent side frame members of those panels so as to provide insulation continuity across the full extent of the wall structure.

After such erection of the panels 10 and 12, the projecting side edges of the inner fabric skin 36 and the outer fabric skin 60 of the panel 12 overlie the inwardly and outwardly facing exposed faces of the second side frame members 20 and 46 respectively of the panel 12 but do not abut the laterally opposed side edges of the inner and outer fabric skins 36 and 60 respectively of the panel 10.

The oven wall structure is shown in FIG. 2 as also comprising two corner posts generally indicated at 90 and 92 which interfit with the outer vertical side edges of the panels 10 and 12 in essentially the same manner as that in which those two panels fit together, insulating material 94 being inserted during erection between the panels and those corner posts. Those posts will be fixed in position and so serve to prevent excessive horizontal lateral separation of the panels 10 and 12 and maintain those panels in their vertical positions. It is also to be noted that, when such corner posts have hollow constructions as shown in FIG. 2, suitable insulating material 96 will be provided in such posts as shown only for the post 92. It is not considered necessary to describe the structure of the corner posts 90 and 92 in further detail. It should, perhaps, however, be noted that the oven structure is shown in FIG. 2 as being provided with a further modular oven wall panel generally indicated at 98 which forms part of a second wall of the oven.

During operation of an oven having the wall structure shown in FIG. 2, heat conduction outwardly through the oven wall is minimized by the thermal insulation provided within and between the wall panels 10 and 12. By using relatively thin steel bars as the tie members 70 and 74, heat conduction through those members is also reduced.

During warm-up of the oven, the inner fabric 14 of the panels 10 and 12 expands but such expansion can take place without difficulty in view of the gaps provided between the panels 10 and 12, the inner skin 36 of the panel 12 sliding horizontally over the exposed face 42 of the second side frame member 20 of the panel 10. Additionally, vertical movement of the inner fabric 14 is possible as a result of the spaces between the bottoms of those fabrics and the bottom of the channel 84.

In the particular oven structure shown in FIG. 2, relative movement is also possible between the corner post 90 and the panel 10 and between the post 92 and the panels 12 and 98.

While the oven structure is shown in FIG. 2 as having only the two panels 10 and 12 between the posts 90 and 92, it will be understood that it is equally within the scope of this invention to utilize a larger number of such panels in an oven wall structure.

While the modular panels 10 and 12 have hereinbefore been specifically described for use in oven wall structures, it should also be understood that such panels can also be used on suitably supporting oven walls as oven roof panels. Additionally, it is possible to utilize such panels as both oven wall panels and oven roof panels in one and the same oven structure, it then of course being necessary to provide suitable means for interfitting such wall and roof panels. One particularly useful support system will now be described with reference to FIG. 4 of the accompanying drawings.

Figure 4:
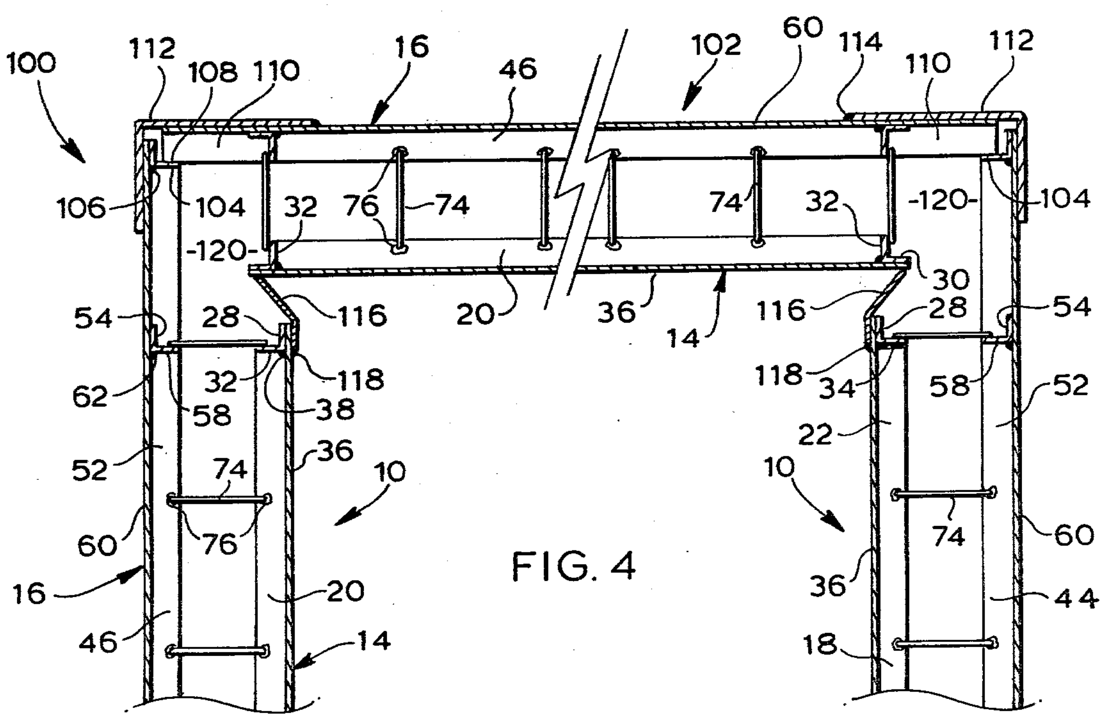

In FIG. 4, there is indicated generally at 100 an oven structure comprising two spaced apart walls and a roof. Each of the walls is assembled in the manner already described, using an appropriate number of the modular panels 10 while the roof is similarly formed from a number of modular panels such as that shown and indicated generally by the legend 102. It should perhaps be explained at this juncture that the wall panels 10 interfit along their vertical side edges in exactly the manner already described and that each of the roof panels will extend between the two oven walls as shown and will interfit along their side edges with each other in the same manner.

To avoid undue duplication of the description herein, those component parts of the roof panel 102 which are essentially identical to the corresponding parts of the wall panels will be identified by the same legends.

To allow the roof panel to be supported on the wall panels 10, the side frame members 44 and 46 of the outer fabric of the wall panels 10 extend upwardly beyond the upper ends of the side frame members 18 and 20 of the inner fabric of such wall panels 10. An angle member 104 is secured, for example, by welding as indicated at 106 across the top ends of the outer fabric side frame members 44 and 46. The angle member 104 has a transversely inwardly projecting flange 108 for supportingly but slidingly receiving the ends of longitudinal extensions 110 of the outer fabric side frame members 44 and 46 of the roof panel 102.

Angled flanges 112 are welded as indicated at 114 to the upper or outer fabric skin 60 of the roof panel 102 so as to project downwardly along the outer fabric skins 60 of the wall panels 10. It should be noted that the flanges 112 are not fastened to the wall panels 10 and do not, therefore, prevent movement of the roof panels 102 relative to the wall panels 10 during expansion and contraction of the oven panels.

To minimize the passage of oven gases into the structural components, a resilient joint-closing flange 116 is secured, for example, by welding as indicated at 118 along the top ends of the inner fabric skins 36 of the wall panels 10 so as to project upwardly and obliquely transversely outwardly therefrom to abut the inner fabric skin 36 of the roof panel 102.

It is believed that the extent to which expansion and contraction of the oven panel components is possible in the oven structure shown in FIG. 4 will now be readily understandable and that no further explanation or description thereof is called for herein. It should, perhaps, however, be repeated that the insulating material provided in the panels 10 and 102 has been omitted from FIG. 4 and it should perhaps also be explained that additional such material will be inserted in the spaces indicated by the legends 120 between the roof panel 102 and the wall panels 10 during erection of the oven structure.

While the invention has hereinbefore been specifically described with reference to the particular embodiments thereof as shown in the accompanying drawings, it will be understood that numerous variations in and modifications of the structures specifically described are possible within the scope of this invention.

For example, the invention embraces the use of one or more modular oven panels as provided by this invention in either an oven wall structure or in an oven roof structure, possibly together with other conventional roof and/or wall structures. Additionally, the invention embraces the use of such novel oven panels in both the walls and roof of a single structure.

The foregoing is a description of preferred embodiments of the invention and is given here by way of example only. The invention is not to be taken as limited to any of the specific features as herein described but comprehends all such variations thereof as come within the scope of the appended claims.

What is claimed is:

1. A modular oven panel which comprises:

an inner fabric which in turn comprises: mutually spaced apart and mutually parallel first and second side frame members of L-shaped angle section having lateral outer edges; mutually spaced apart and mutually parallel end frame members secured to said side frame members and extending perpendicularly therebetween to provide a relatively rigid rectangular frame structure; and an essentially continuous inner fabric skin secured to said frame structure and having an edge portion projecting laterally beyond said lateral outer edge of one of said side frame members and terminating laterally inwardly of said lateral outer edge of the other of said side frame members so as to provide a transversely inwardly directed face of said side frame exposed beyond said inner fabric skin;

an outer fabric transversely outwardly spaced from said inner fabric and which in turn comprises: mutually spaced apart and mutually parallel first and second side frame members of L-shaped angle section having lateral outer edges; mutually spaced apart and mutually parallel end frame members secured to said side frame members of said outer fabric and extending perpendicularly therebetween to provide a relatively rigid rectangular frame structure; and an essentially continuous outer fabric skin secured to said frame structure of said outer fabric and having an edge portion projecting laterally beyond said lateral outer edge of one of said frame members on one side edge of said outer fabric, and having an opposite edge portion terminating laterally inwardly of said lateral outer edge of the other of said side frame members on the opposite side edge of said outer fabric, so as to provide a transversely outwardly directed face of said side frame member exposed beyond said outer fabric skin on said opposite side edge, said projecting edge portions of said inner and outer fabric skins defining a predetermined spacing therebetween and being free of fold lines whereby to lie in the same plane as their respective inner and outer fabric skins, and said exposed faces of said inner and outer side frame portions defining a predetermined spacing adapted to be slidably received within said projecting edge portions of said inner and outer fabric skins of an adjacent said panel; and transverse tie members secured to said frame members of said inner fabric and said outer fabric and extending therebetween to maintain said fabrics in mutually spaced apart disposition said tie members being resilient to permit thermal expansion of one said fabric relative to the other, whereby two said modular oven panels can be placed in side-by-side disposition with said inner fabric skin of one such panel overlying a said exposed face of a said side frame member of the inner fabric of the other such panel and with said outer fabric skin of one such panel overlying a said exposed face of a said side frame member of the outer fabric of the other such panel for relative telescopic movement of such fabric skins across said exposed faces of said side frame members on expansion and contraction of said fabrics while said oven panels form a smooth wall both on the inner and outer sides free of fold lines.

2. A modular oven panel as claimed in claim 1, in which said first and second side frame members of said inner fabric are disposed transversely opposite said first and second side frame members respectively of said outer fabric, and in which said inner and outer fabric skins project laterally beyond said lateral outer edges of said first side frame members of said inner and outer fabrics respectively.

3. A modular oven panel as claimed in claim 2 and which additionally comprises thermal insulating material disposed between said inner and outer fabrics.

4. A modular oven panel as claimed in claim 3 and in which said thermal insulating material is in the form of a plurality of layers of different such materials.

5. A modular oven panel as claimed in claim 2 and in which said side frame members and said end frame members of said inner and outer fabrics are in the form of angle members having said fabric skins secured thereto and comprising flanges projecting transversely toward the other of said inner and outer fabrics with said tie members secured to said flanges.

6. A modular oven panel as claimed in claim 2 for use as an oven side wall panel, and in which said outer fabric including said side frame members thereof extends laterally beyond a first said end frame member of said inner fabric and including an outer end frame supporting member secured terminally to said outer side frame members for supporting an oven roof panel.

7. A modular oven panel as claimed in claim 6 and which additionally comprises a resilient joint-closing flange secured generally along said first end frame member of said inner fabric so as to project obliquely and laterally outwardly therefrom to abut an oven roof panel supported thereon and being unattached to said oven roof panel whereby to provide a seal between said inner fabric and said roof panel adapted to flex due to thermal expansion and contraction and permit relative movement therebetween.

8. A modular oven panel as claimed in claim 7 and in which said side frame members of said outer fabric extend longitundinally at both ends thereof beyond said inner fabric for supporting such a panel on two spaced apart oven wall panels.

9. A modular oven panel as claimed in claim 8 and which additionally comprises an L-shaped outer sealing flange secured along said first end of said outer fabric of said roof panel and projecting transversely therefrom for sliding overlying engagement with the outer fabric of an oven wall panel supporting said oven roof panel and being unattached thereto whereby to permit relative movement.

10. A modular oven panel as claimed in claim 2 for use as an oven wall panel and in which said side frame members of said outer fabric extend longitudinally beyond lower ends of said side frame members of said inner fabric for supporting said inner fabric of said panel in a cantilevered manner on a supporting surface.

* * * * *